(12) United States Patent
Hill

(10) Patent No.: US 8,989,892 B2
(45) Date of Patent: Mar. 24, 2015

(54) APPARATUS AND METHOD FOR THE DEFINED INTERMEDIATE STORAGE AND PICKING OF PRODUCED ARTICLES OF THE SAME TYPE BUT DIFFERENT SIZE

(75) Inventor: Hans-Peter Hill, Karlsruhe (DE)

(73) Assignee: Grenzebach Maschinenbau GmbH, Asbach-Baeumenheim (DE)

( * ) Notice: Subject to any disclaimer, the term of this patent is extended or adjusted under 35 U.S.C. 154(b) by 0 days.

(21) Appl. No.: 13/985,256

(22) PCT Filed: Feb. 29, 2012

(86) PCT No.: PCT/DE2012/000210
§ 371 (c)(1),
(2), (4) Date: Aug. 13, 2013

(87) PCT Pub. No.: WO2012/116690
PCT Pub. Date: Sep. 7, 2012

(65) Prior Publication Data
US 2014/0236343 A1 Aug. 21, 2014

(30) Foreign Application Priority Data
Mar. 3, 2011 (DE) .......... 10 2011 012 950

(51) Int. Cl.
*G06F 7/00* (2006.01)
*B65G 1/137* (2006.01)

(52) U.S. Cl.
CPC ............ *B65G 1/1375* (2013.01); *B65G 1/1378* (2013.01); *B65G 2201/0273* (2013.01)
USPC ........... 700/216; 700/213; 700/214; 700/217; 700/218; 700/215; 700/228

(58) Field of Classification Search
CPC ... G06Q 10/08; G06Q 10/087; B65D 1/1378; G05D 1/0274
USPC .......... 700/213–214, 216–219, 228, 229, 230
See application file for complete search history.

(56) References Cited

U.S. PATENT DOCUMENTS

| 4,538,950 A | 9/1985 | Shiomi et al. |
| 5,417,038 A | 5/1995 | Babel |

(Continued)

FOREIGN PATENT DOCUMENTS

| DE | 693 10 858 | 1/1998 |
| DE | 101 16 067 | 10/2002 |

(Continued)

OTHER PUBLICATIONS

German Patent Office Action for corresponding German Patent Application No. 10 2011 012 950.2 dated Nov. 8, 2011 (7 pages).

(Continued)

*Primary Examiner* — Yolanda Cumbess
(74) *Attorney, Agent, or Firm* — Duane Morris LLP; J. Rodman Steele, Jr.; Gregory M. Lefkowitz

(57) ABSTRACT

Apparatus and method for the defined intermediate storage of produced articles of the same type but different size and for the simultaneous composition of consignments of said articles, having the following features: a) a delivery path (3) for the continuous conveying of the produced products into the region of stacking robots (7), b) a multiplicity of transport vehicles (9) for transporting stacking pallets and order-picking pallets (6), c) a multiplicity of storing positions (10) for stacking pallets, d) one or more stacking robots (5) for filling order-picking pallets (6), e) a plurality of induction lines (8) for power supply and control of the transport vehicles (9).

13 Claims, 6 Drawing Sheets

(56) References Cited

U.S. PATENT DOCUMENTS

Figure 1:
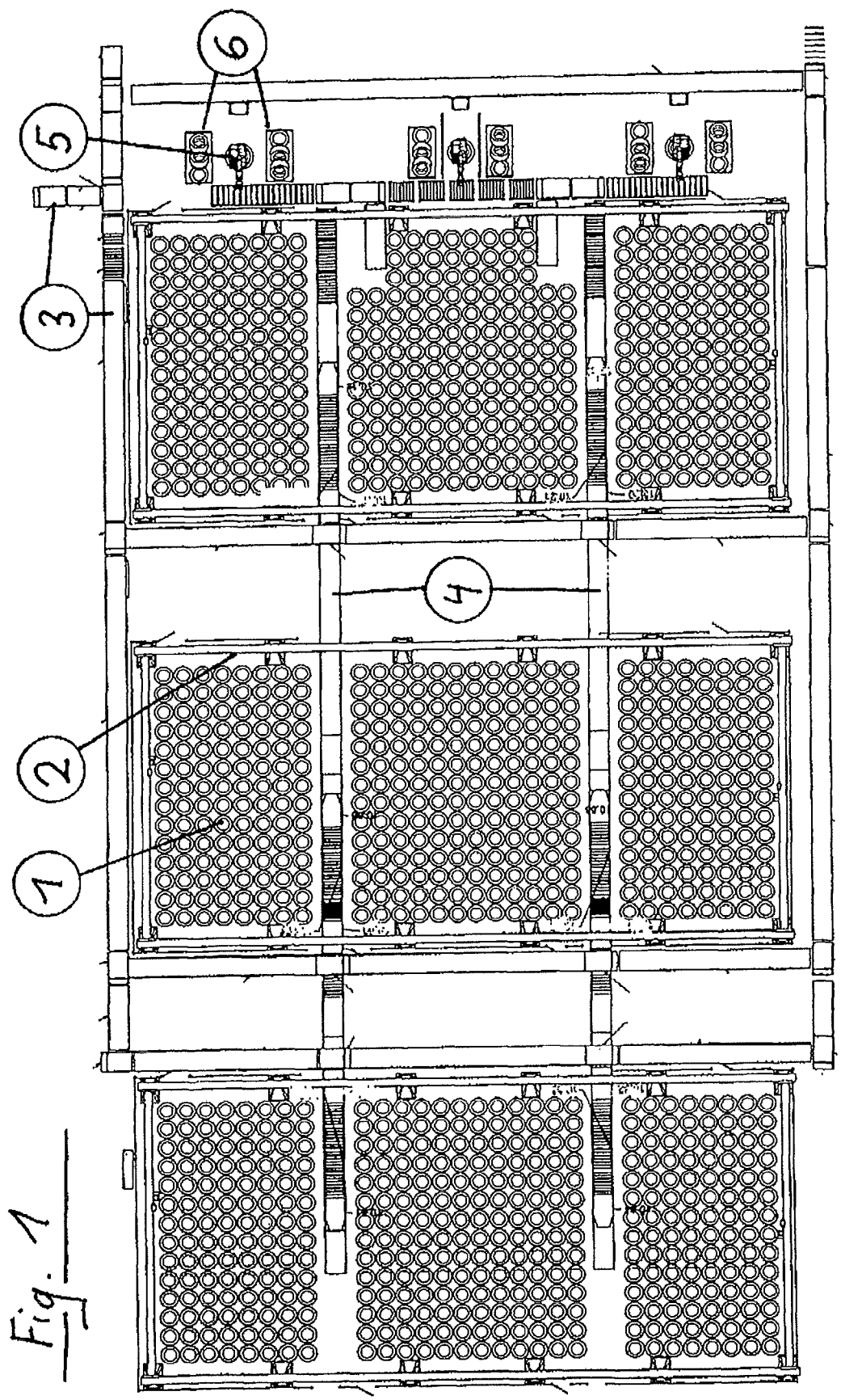

| | | | |
|---|---|---|---|
| 6,325,586 B1 * | 12/2001 | Loy | 414/281 |
| 6,362,443 B1 * | 3/2002 | Kinoshita et al. | 209/574 |
| 6,589,001 B2 | 7/2003 | Peltomäki | |
| 6,873,881 B1 * | 3/2005 | Schneible, Sr. | 700/216 |
| 2008/0131255 A1 * | 6/2008 | Hessler et al. | 414/788.1 |

FOREIGN PATENT DOCUMENTS

| | | |
|---|---|---|
| DE | 101 42 395 | 11/2002 |
| DE | 696 22 116 | 3/2003 |
| DE | 103 07 232 | 9/2004 |
| DE | 601 04 926 | 1/2005 |
| DE | 10 2006 057 758 | 6/2008 |
| EP | 0 767 113 | 4/1997 |
| EP | 1 535 864 | 6/2005 |
| JP | 06086470 | 3/1994 |

OTHER PUBLICATIONS

International Search Report for corresponding International Patent Application No. PCT/DE2012/000210, dated Jul. 5, 2012 (4 pages).

* cited by examiner

APPARATUS AND METHOD FOR THE DEFINED INTERMEDIATE STORAGE AND PICKING OF PRODUCED ARTICLES OF THE SAME TYPE BUT DIFFERENT SIZE

CROSS-REFERENCE TO RELATED APPLICATIONS

This application is a §371 national stage entry of International Application No. PCT/DE2012/000210, filed Feb. 29, 2012, which claims priority to German Patent Application No. 10 2011 012 950.2 filed Mar. 3, 2011, the entire contents of which are incorporated herein by reference.

Vehicle tires serve below as an example of such articles. For example, variously dimensioned vehicle wheel rims or even, for example, cheese wheels are conceivable as further articles. However, stackable articles, the surfaces of which are structured in a different manner, can also be supplied by means of the storage and picking system as claimed in the invention.

Modern vehicle tires are a complicated, high-tech product with more than ten different rubber compounds and between 15 and 20 components. The time and money spent during development and production is high. In this connection, the development work is only the first step on the path to the quality product. The respective process chain is only concluded successfully by means of a fault-free production process. The most modern production plants in conjunction with trained personnel and multiple control mechanisms ensure the high production standard. This begins as early as in the selection of raw materials by means of certified suppliers.

The production itself is effected in various production stages at the stations for mixing, inner tube, tire gaiter, core and apex, belt, running strip, assembly and vulcanization. A quality control then takes place thereafter.

Approximately up to 300 different types of vehicle tires are produced in the production process.

Said produced variety of types has to be stored until delivery to the customer and the respective types have to be able to be easily obtainable and prepared for dispatch.

For this purpose, DE 696 22 116 T2 makes known a robot system which has a robot which is movable over an operating surface and is suitable for forming and conveying batches of goods units which include several units and which are removed in vertical stacks inside an operating surface from sandwiched goods units. The robot, in this connection, has a vertically movable gripping apparatus which enables the robot to remove goods units from the top of selected stacks and/or to deposit such types of units on the top of selected stacks.

To fulfill its task, said robot system is characterized in that the gripping apparatus includes a vertically movable tower-like load receiving apparatus which defines a load space for receiving stacked goods units, as well as a gripping means on the bottom end of the load receiving apparatus, the load receiving apparatus being dimensioned in the vertical direction such that it is able to receive and surround several goods units which are generally carried vertically on the top of a bottom-most goods unit which is held by the gripping means.

By controlling its vertical movement, the gripping apparatus is capable of selectively removing at least one goods unit from a vertical stack of goods units or of selectively supplying at least one goods unit to a vertical stack of goods units.

The achievement here is that the number and composition of goods units in a batch of goods units, which are removed by the robot and are supplied to an unloading location, are able to be freely selected and varied according to a preset instruction.

DE 601 04 926 T2 makes known a goods transfer arrangement for goods units which includes a storage area for goods units and a loading area for goods units in the direct vicinity of one another and a robot system which includes a receiving robot for goods units which is movable in the storage area. In addition, said goods transfer arrangement has a movement system for transfer stack rows in order to move transfer stack rows formed by the receiving robot, which are arranged in an operating area of the receiving robot for goods units, is set up in order to extend as far as up to the storage area.

In the case of said known arrangement, obstacles and problems of the prior art and the time for manual work are to be minimized.

To solve said task, the concept of the operating area of the movement system for the transfer stack rows being set up in order to reach both the storage area for goods units and the loading region for goods units is to be protected.

A further apparatus from the prior art without printed proof is shown in FIG. 1. Said apparatus, as can be seen from the numerous stacks of round symbols for vehicle tires which can be recognized from above, is constructed especially for the storage of vehicle tires. In this connection, one of the nine fields of tires shown is characterized by way of the reference 1. One of the gantry cranes used, which is movable over the relevant operating area, with its gripping apparatuses for grasping the tires in each case from the top surface of the relevant stack, can be seen in the center of said fields by way of the reference 2. The supplying of the tires from the production line is effected in this connection by means of the two delivery paths 3 shown. These can consist of means which have functions similar to a conveyor belt.

The removal paths 4 for filling the pallet of a consignment extend, as shown, in a usual manner along the two center longitudinally extending paths. The filling of the pallets 6 of a consignment to be supplied is effected by means of the three stacking robots 5 shown in the right-hand part of the figure.

Said representation does not show the manner in which the gripping apparatus of a gantry crane 2 in each case grasps the tires from the top. In this case, a gripping apparatus is used which dips into the desired stack from above and grasps the relevant tire by means of claw-like apparatuses which move apart from one another from the inside. The subsequent depositing of the relevant tire is effected in the reverse order.

The individual tire stacks are packed closely side by side in the case of said apparatus, as can easily be seen in FIG. 1.

As a main disadvantage of this type of storage, it has been proven in practice that the individual tire stacks interact on account of their tight packing and, for example, where the packing heights vary, can fall down inside the composition. In this case, the disorder caused as a consequence is only able to be repaired by means of hour-long tidying up by means of manual labor. An interruption to a current production process and to an order-picking process taking part at the same time caused as a result is not tolerable and causes high costs.

It is consequently the object of the present invention to create an apparatus and a method for the defined intermediate storage and picking of produced articles of the same type but different size which make it possible to carry out the storage operation in a rapid and reliable manner and, at the same time, to enable smooth order-picking of the articles required.

Said apparatus is achieved by the apparatus as claimed in claim 1 or the method as claimed in claim 9.

Essentially said solution consists in that the articles are conveyed by means of special transport vehicles and by means of particular technical equipment in such a manner that the time expended reaches a minimum and the reliability reaches a maximum.

The apparatus as claimed in the invention is described more below, in which, in detail:

FIG. 1: shows a top view of an apparatus as claimed in the prior art

Figure 2:
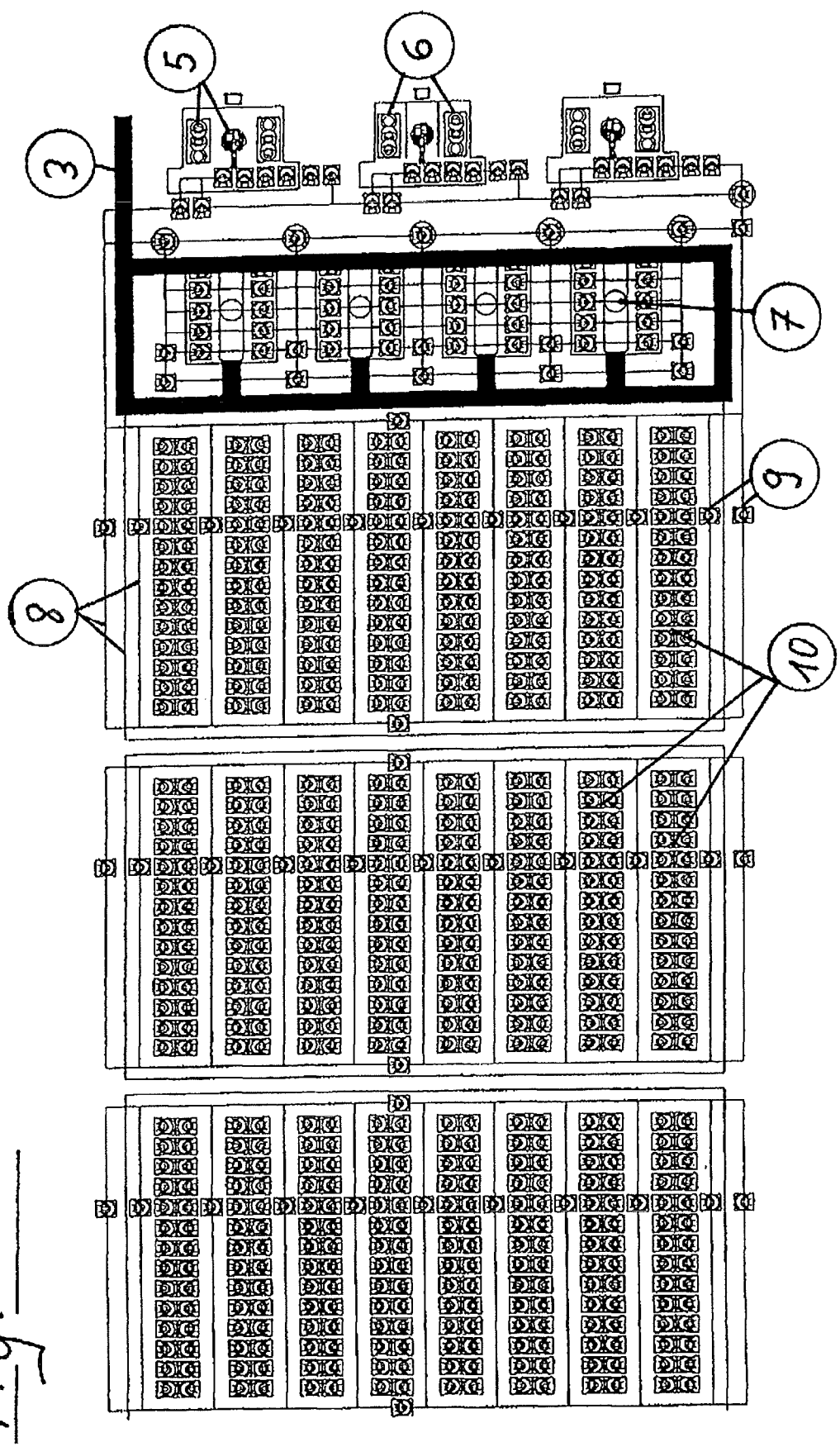

FIG. 2: shows a top view of the apparatus as claimed in the invention

Figure 3:
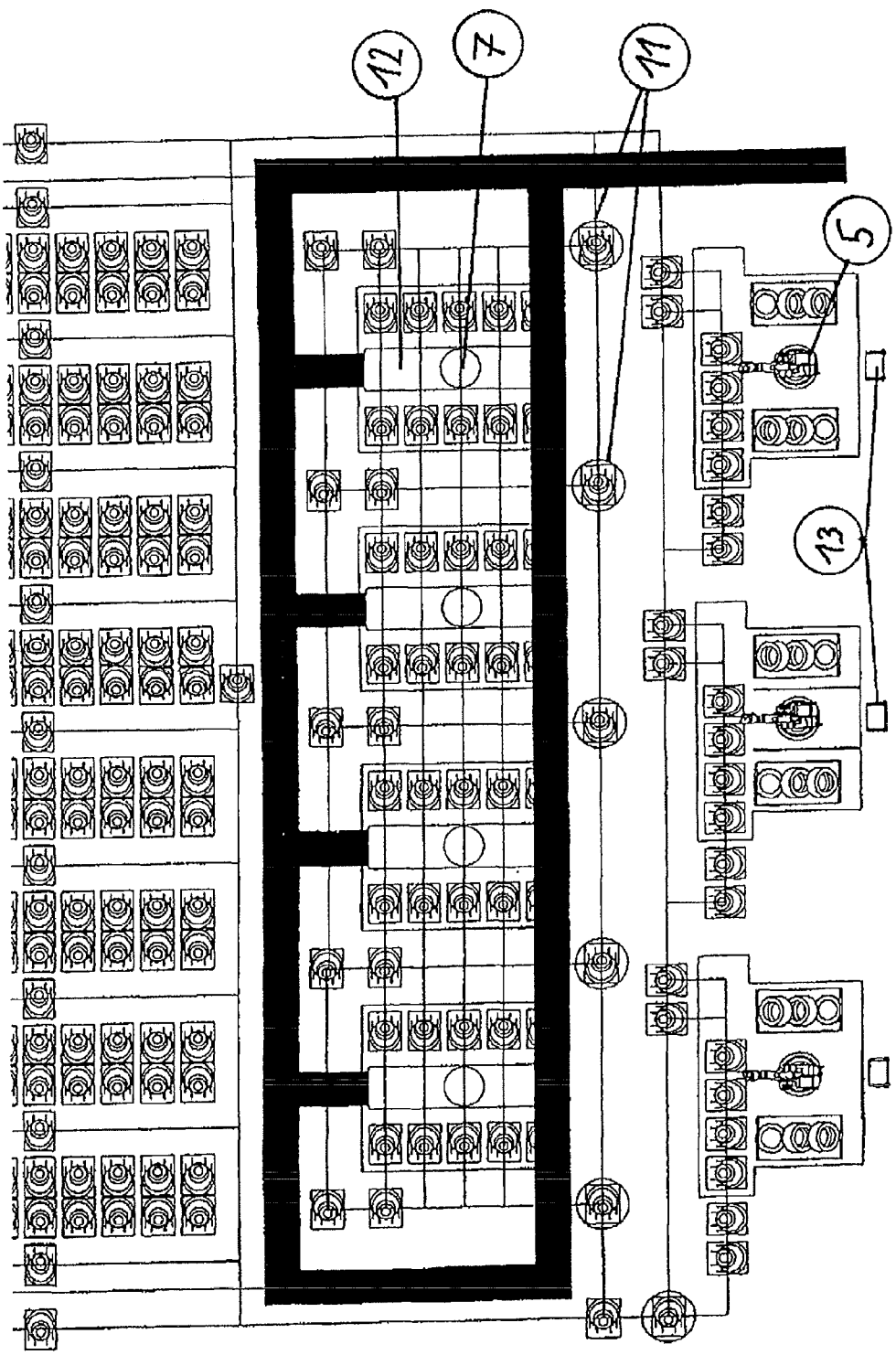

FIG. 3: shows a top view of a detail in FIG. 2

Figure 4:
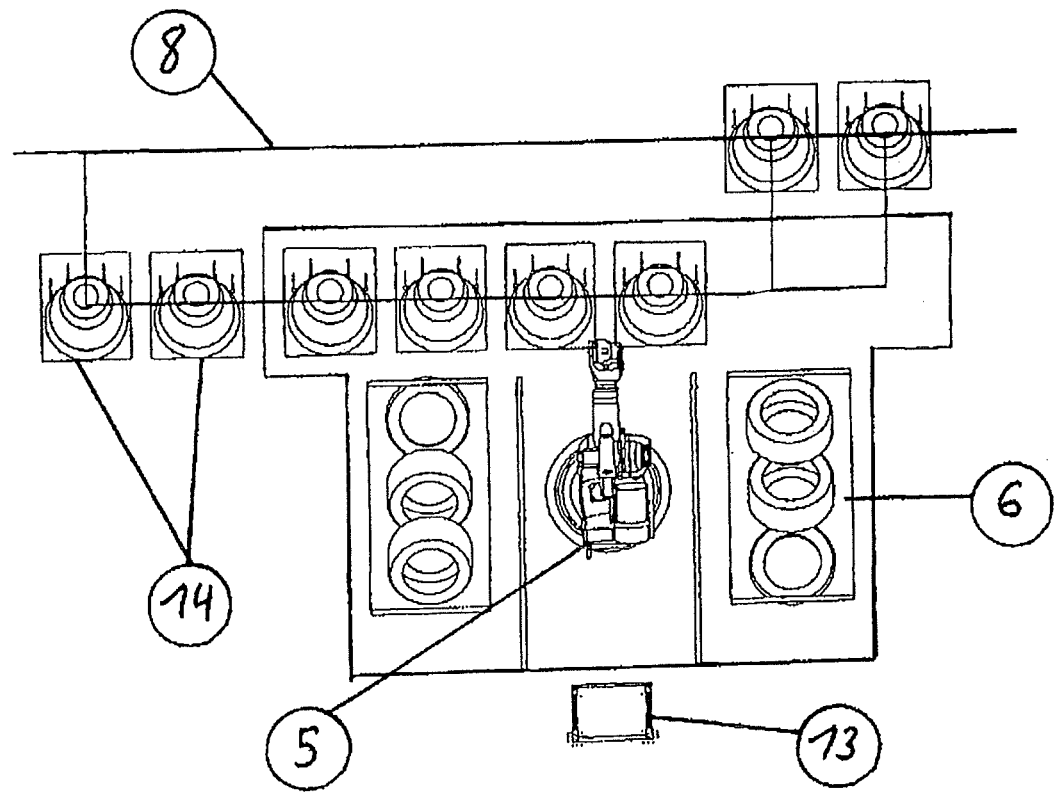

FIG. 4: shows a representation of a detail of the composition of a commission

Figure 5:
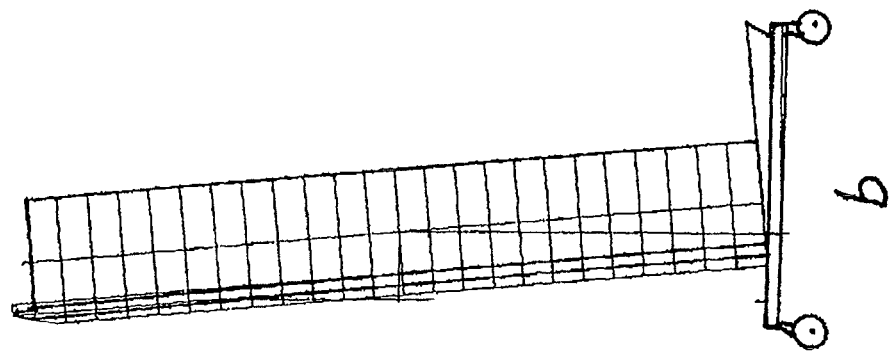
Figure 5:
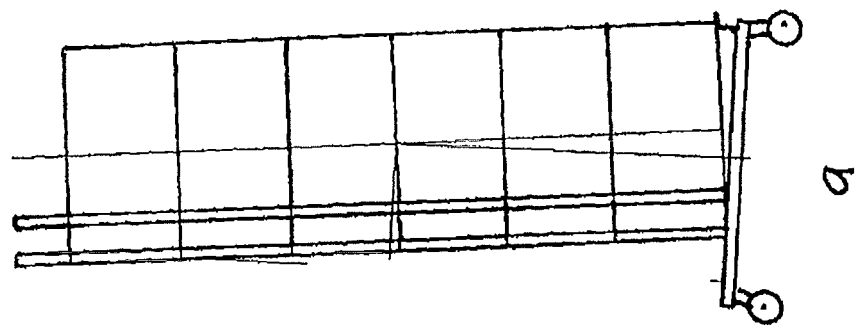

FIG. 5: shows a side view of a stacking pallet trolley

Figure 6:
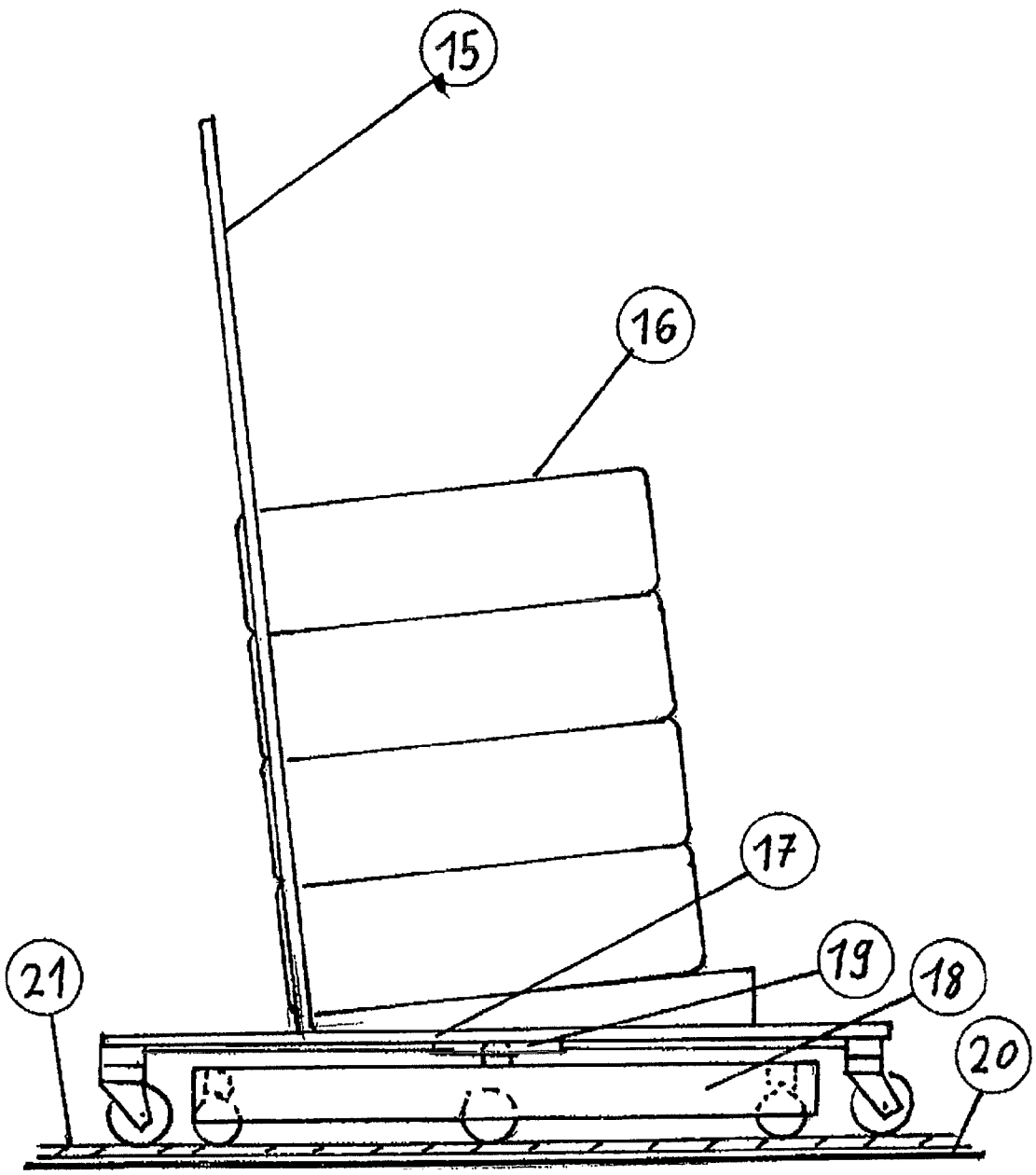

FIG. 6: shows a side view of a transport vehicle with a stacking pallet trolley.

In FIG. 1, in the case of the apparatus as claimed in the invention in the top view in FIG. 2, the delivery path 3 of the goods supplied from the production line can be seen in the top right-hand corner. In this connection, this can be roller conveyors or similar transport means. The delivery path 3, which is shown in black, describes here a path which essentially describes a completely closed rectangle as a moving pathway for said goods, the entire delivery path 3 extending along an elevated level which allows the subsequently described stacking pallet trolleys to move through under the delivery path 3. This cannot be seen in the top view in FIG. 2.

A separate representation of said simple fact does not seem to be necessary.

In the region of the delivery path 3, on the left-hand side four transfer points are shown in the form of short, part sections which branch off from the delivery path 3. Said part sections serve for the targeted channeling out of goods which reach the delivery path 3 in the course of goods being supplied from the production line. The respective channeling out is effected by the relevant goods being lifted up from the delivery path 3 by means of mechanical means which, for example, pass through the transporting roller conveyor, and being conveyed to the desired part section. In a comparable manner, it is also possible to forward the goods and change their direction at the "corners" of the delivery path 3 shown. "Curved sections" can naturally also be constructed. The technology applied in this connection is known to the expert.

Sensors are used to control the channeling out of the desired goods to the desired channeling out locations in the regions of the relevant stacking robots 7. Said sensors, not shown in this case for the purposes of clarity, can be realized, for example, as barcode readers or RFID transponders.

The goods, which have landed at the shown four transfer points of the delivery path 3, are then used by one of the stacking robots 7, four shown in this case, for filling stacking pallet trolleys 14 which are described subsequently in FIG. 4. In addition to the four transfer points of the delivery path 3 shown in FIG. 2, further such transfer points can be provided on the opposite side where correspondingly required.

The stacking pallet trolleys 14 are conveyed by means of transport vehicles 18 which can be pushed under the stacking pallet trolleys 14 and are connected to the same by means of a special coupling.

The transport vehicles 18 in conjunction with a stacking pallet trolley 14 are given the reference 9.

Two such transport vehicles 9 with guided stacking pallet trolleys are characterized as an example as particular surface pieces on the bottom edge of FIG. 2. It can be seen that all these types of surface pieces shown from above in FIG. 2 are such transport vehicles 9 with guided stacking pallet trolleys 14, as they are situated along an induction loop 8. Parked stacking pallet trolleys 14, when viewed from above, however, appear in the same manner, as a transport vehicle 18 which may be present is not able to be recognized from above.

The transport vehicles 18 are supplied with electric energy and at the same time are controlled with regard to their movement by means of induction loops 8 which are laid in the ground (cf. top edge in FIG. 2).

The induction loops 8 serve for transmitting energy in a contact-free manner to the transport vehicles 18 by means of electromagnetic induction (Michael Faraday, 1831). The transport vehicles 18 obtain not only the electric power supply for their drive in this manner but also by means of a special bus system the control pulses necessary for their guided movement and positioning. In place of the described system of induction loops 8, such transport vehicles 9 can also be driven, however, by means of the energy supply provided by storage batteries, the control of their movement being effected by means of strip-shaped information means on the surface of the floor in the manner of bar codes. By means of such bar code strips, it is possible for a transport vehicle to determine its intermediate stopping location at any point by means of a read device installed in the vehicle. Such a manner of supplying energy and controlling the movement of transport vehicles 9 is more cost-efficient to produce than the installation of induction loops 8.

Other path markings for the orientation of the transport vehicles such as known radio frequency data communication systems are also conceivable in place of the described bar code strips.

The reference 10 in FIG. 2 designates three storage locations for stacking pallet trolleys 14 as an example.

The composition of consignments of goods to be supplied can be effected at the same time as filling the warehouse stock, which is shown on the left-hand side as an example as consisting of 24 rows each of 28 storage locations 10.

This is characterized on the right-hand side of FIG. 2 by one stacking robot, of a total of three shown, given the reference 5, for filling the pallet of a consignment. In addition, two order-picking pallets 6 can also be clearly identified in particular. The order-picking pallets 6 are moved along the normal path, for instance by way of fork lift trucks for dispatch on lorries or the like.

The gripping tools of the stacking robots 5 and 7 are adapted to the goods produced in each case. Their development is familiar to the expert.

FIG. 3 shows a top view of a detail of FIG. 2, namely the region of the delivery path 3 which is shown in the manner of a rectangle. In this case, once again, four recorded stacking robots 7 are shown, the right-hand one of which is separately designated. In said example, the reference 12 marks the path required by the stacking robot 7 for its function of filling the stacking pallet trolley 14. Correspondingly developed surface portals can also be used in place of the stacking robots 7.

The turning locations 11 can be provided for changing a transport vehicle 18 into the region of another induction loop 8.

As, in this case, it is possible for the energy supply of the respective transport vehicle 18 to be interrupted in the short term, the transport vehicles 18 have a sufficiently dimensioned storage battery which ensures the supply of electric energy for a specific bridging time. This not only applies to ensuring the possibility of forward movement but also to ensuring the availability of the data systems. This ensures that the respective storage battery is always fully charged during normal operation.

In place of the functional use of the turning locations 11, it is also possible to have a reverse turn described for a transport vehicle by detecting the speed of the different wheels of the same and their various control processes.

A stacking robot 5 is characterized in this case, as in FIGS. 1 and 2, for filling the pallet of a composition of a consignment taking place at the same time. In addition, two of the control stands or operating stands 13 are shown in FIG. 3.

FIG. 4 shows a representation of a detail of the composing of a consignment. One of the two recognizable order-picking pallets 6 is characterized along with the induction loop 8 which is responsible for said area, the stacking robot 5 which is shown in more detail in top view and the relevant control stand 13. Two stacking pallet trolleys 14 are characterized in particular in the left-hand region of FIG. 4.

FIG. 5 shows a stylized side view of a stacking pallet trolley 14.

It can be seen here that the bearing surface of a stacking pallet trolley 14 has an inclined bottom bearing surface in order to obtain a defined position for the respective goods stack. In case a), for example, only six large-volume vehicle tires are stacked on the pallet; in case b), in contrast, several smaller vehicle tires are stacked on the pallet. The stack supports, against which the tire stacks lean, are shown in each case on the left-hand side. Only the rear and the front stack support can be seen in each case in said representation.

FIG. 6 shows a side view of a transport vehicle 18 with a stacking pallet trolley. Particularly shown in this case are the rear stack supports with the reference 15 and the top tire of the stack with the reference 16. The actual even platform of the stacking pallet trolley shown is given the reference 17.

A transport vehicle 18 can have a distance sensor which is not shown separately here, acts in a contact-free manner and increases the operational reliability along with the control system as claimed in the invention.

The actual transport vehicle 18 is connected by means of a coupling 19 to the platform 17 of the stacking pallet trolley 14 by means of a counterpart which is adapted to the coupling 19.

An induction line 20 is indicated in the region of the floor 21.

The stacking pallet trolley 14 shown in FIG. 6 has four so-called trailing wheels. This means that if there is a movement, from wherever it is brought about, the stacking pallet trolley 14 is moved in the direction from which the force for movement came, as the wheels shown immediately pivot into the direction in which the movement leads. As slight floor irregularities are never to be excluded and, on the other hand, stacking pallet trolleys 14 parked in a defined manner in the interim storage location have to stand in a fixed manner even in the case of slight impacts, a parking brake, which acts on all four wheels and is automatically activated if a transport vehicle 18 moves off, ensures that a parked stacking pallet trolley 14 stands securely and remains standing securely.

A more cost-efficient possibility to fix the position of a transport vehicle 18 is to install stop strips which define a certain stand location on the stand locations provided.

As, when a transport vehicle 18 moves underneath a parked stacking pallet trolley 14, the described parking brake has to be slackened, it is ensured that the parking brake is slackened when a coupling 19 is latched into the counterpart located on the stacking pallet trolley 14.

A weight sensor, which, on request or constantly, registers the load acting on the coupling by means of a bus system or by radio, is additionally incorporated in the coupling 19. On the one hand, this makes redundant the possibility of the central control to check whether the number and the type of the goods located on the relevant stacking pallet trolley 14 essentially match the weight provided by the coupling sensor. On the other hand, it is ensured in this manner that a transport vehicle 18 is never overloaded. A further possibility for controlling the transport vehicles 18 is, as an example, to produce additionally a radio connection to each transport vehicle 18 being used (additional transmitter-receiver necessary) in the area of the original operating region by means of a GPS-similar system. As is known, three correspondingly dimensioned transmitting stations with different transmitting frequencies in the operating region are sufficient for successful triangulation. In practice, more than three well-distributed transmitting stations are used in order to obtain reliable availability of all the transport vehicles 18 even in the case of threatening radio shadowing.

Said exemplary expansion of the control possibilities for the storage and order-picking method as claimed in the invention on the one hand supplements the possibilities concerning safety regulations and on the other hand, however, opens up a completely novel possibility for future planning.

For, in the event of an unexpected threatening increase in capacity, it is immediately possible by means of said GPS-similar system to expand the existing warehouse insofar as only sufficient roofing-over is ensured. An increased capacity of the storage batteries of the transport vehicles 18 and the installation of corresponding transmitting stations immediately create the possibility of a desired warehouse expansion without first having to lay additional induction lines. Another specific control stand 13, however, is necessary for this case.

The control of the complicated movement operations and the processing of the signals of the sensors used require a special control program.

LIST OF REFERENCES

1 Storage location for tires
2 Gantry crane with gripping apparatus
3 Delivery path of the production line
4 Removal path for filling the pallet for a consignment
5 Stacking robot for filling the pallet for a consignment
6 Order-picking pallets
7 Stacking robot for filling pallet trolleys
8 Induction loops
9 Transport vehicle with guided stacking pallet trolleys
10 Parking locations for stacking pallet trolleys
11 Turning location for transport vehicles 18, 9
12 Travel path of a stacking robot 7
13 Control stand, operating stand
14 Stacking pallet trolley
15 Stacking support
16 Tires
17 Platform of a stacking pallet trolley
18 Transport vehicle
19 Coupling
20 Induction line
21 Floor

The invention claimed is:

1. An apparatus for the defined intermediate storage of produced articles of different size and of the same type and for the simultaneous composition of consignments of said articles, said apparatus comprising:
  a) a delivery path for conveying the produced products continuously into a region of stacking robots,
  b) a plurality of transport vehicles for transporting stacking pallet trolleys,
  c) a plurality of storage locations for the stacking pallet trolleys,
  d) one or several stacking robots for filling order-picking pallets,
  e) a plurality of induction lines for power supply and control of the transport vehicles, and f) transport vehicles designed to be able to travel under a stacking pallet trolley, wherein an upper surface of the transport vehicle has a removable coupling that is removably connectable to the trolley by a counterpart on said trolley, g) (1) wherein the transport vehicles have a non-contact distance sensor, and a storage battery for bridging a power supply; and wherein, when connecting the counterpart of the stacking pallet trolley to the transport vehicle the coupling includes a mechanism which automatically triggers an automatic braking system that controls said stacking pallet trolley when stationary, or (2) wherein the stacking pallet trolleys have a bearing surface which is slightly inclined toward a floor surface and said bearing surface has one or more stacking supports at the lowest point, or (3) both g)(1) and g)(2).

2. The apparatus as claimed in claim 1, wherein the produced articles are vehicle tires.

3. The apparatus as claimed in claim 1, further comprising code rails, which are scanned for determining the position of photoelectric barriers; wherein said code rails are used along the travel paths of the transport vehicles.

4. The apparatus as claimed in claim 1, wherein the induction lines have crossing points and a change between the individual line regions is possible at said crossing points.

5. The apparatus as claimed in claim 1, wherein to change the direction of the conveyed articles, means are provided in the region of the delivery path which enable the articles to be identified by sensors; wherein the articles are lifted and forwarded in a direction that is different from the original direction.

6. The apparatus as claimed in claim 1, wherein the operating reliability is increased by an additional control system for the transport vehicles; said additional control system comprising of a plurality of additional transmitting stations with a different transmitting frequency; and wherein each transport vehicle includes transmitter-receivers comprising a GPS system.

7. A method for the defined intermediate storage of produced articles of different size and of the same type, and for the simultaneous composition of consignments of said articles, said method comprising:

a) supplying the produced articles by a delivery path to a plurality of transfer points which are located in the region of stacking robots for filling stacking pallet trolleys, b) filling a plurality of stacking pallets with the stacking robots, wherein said stacking pallets are moved by transport vehicles to a multitude of storage locations, c) supplying energy to the transport vehicles by induction lines, and simultaneously guiding, positional determining and positioning the transport vehicles via a data bus system coupled to the induction lines, wherein a power supply is supported by a chargeable storage battery, and wherein the induction lines include crossing points, wherein a change between different induction line regions is possible at said crossing points, and d) simultaneously filling order-picking pallets for dispatch with a plurality of stacking robots from stacking pallets (14) from an intermediate storage location as each transport vehicle approaches the storage locations, e) (1) wherein the transport vehicles have a non-contact distance sensor, and a storage battery for bridging a power supply; and wherein, when connecting the counterpart of the stacking pallet trolley to the transport vehicle the coupling includes a mechanism which automatically triggers an automatic braking system that controls said stacking pallet trolley when stationary, or (2) wherein the stacking pallet trolleys have a bearing surface which is slightly inclined toward a floor surface and said bearing surface has one or more stacking supports at the lowest point, or (3) both e)(1) and g)(2).

8. The method as claimed in claim 7, further comprising code rails on travel paths of the transport vehicles, where said code rails are scanned for determining the position of photoelectric light barriers, and wherein a change between different line regions is facilitated by defined rotations of the transport vehicles and by detecting the speed of the wheels and different control of the wheels.

9. The method as claimed in claim 7, wherein to change the direction of the conveyed articles, means are provided which enable the articles to be lifted and forwarded in a direction which is different from the original direction.

10. The method as claimed in claim 7, wherein a storage capacity of the storage locations and an operating reliability of the system are increased by providing an additional control system for the transport vehicles, said additional control system including a plurality of additional transmitting stations each with a different transmitting frequency, and wherein each transport vehicle further includes a transmitter-receiver including a GPS system.

11. A computer program product executed on a non-transitory storage medium having a program code for carrying out the method steps as claimed in claim 7, wherein said program code is executed on a computer.

12. A non-transitory, machine-readable carrier having a program code of a computer program for carrying out the method as claimed in claim 7, when the program is executed on a computer.

13. A method for the defined intermediate storage of produced articles of different size and of the same type, and for the simultaneous composition of consignments of said articles, said method comprising:

a) supplying the produced articles by a delivery path to a plurality of transfer points which are located in the region of stacking robots for filling stacking pallet trolleys, b) filling a plurality of stacking pallets with the stacking robots, wherein said stacking pallets are moved by transport vehicles to a multitude of storage locations, c) supplying energy to the transport vehicles by a chargeable storage battery, and providing code rails on travel paths of the transport vehicles, where said code rails are scanned for determining the position of photoelectric light barriers, and wherein a change between different line regions is facilitated by defined rotations of the transport vehicles and by detecting the speed of the wheels and different control of the wheels, and d) simultaneously filling order-picking pallets for dispatch with a plurality of stacking robots from stacking pallets (14) from an intermediate storage location as each transport vehicle approaches the storage locations, e) (1) wherein the transport vehicles have a non-contact distance sensor, and a storage battery for bridging a power supply; and wherein, when connecting the counterpart of the stacking pallet trolley to the transport vehicle the coupling includes a mechanism which automatically triggers an automatic braking system that controls said stacking pallet trolley when stationary,
(2) wherein the stacking pallet trolleys have a bearing surface which is slightly inclined toward a floor surface and said bearing surface has one or more stacking supports at the lowest point, or
(3) both e)(1) and g)(2).

* * * * *